United States Patent [19]

Lindquist et al.

[11] 3,915,285
[45] Oct. 28, 1975

[54] APPARATUS FOR SPACING CANS
[75] Inventors: Steven M. Lindquist, Pittsburgh; Elmer E. Harris, Glenshaw, both of Pa.
[73] Assignee: H. J. Heinz Company, Pittsburgh, Pa.
[22] Filed: Feb. 14, 1974
[21] Appl. No.: 442,498

[52] U.S. Cl. .................. 198/34; 134/72; 134/131; 134/151; 165/120
[51] Int. Cl.² ........................................ B65G 47/26
[58] Field of Search ........ 198/34; 134/72, 131, 151, 134/25 A; 165/120

[56] References Cited
UNITED STATES PATENTS
3,263,794  8/1966  Burton ............................. 198/34
3,283,523  11/1966  Long ............................ 165/120 X FOREIGN PATENTS OR APPLICATIONS
849,691  9/1960  United Kingdom ................. 165/120

*Primary Examiner*—Richard A. Schacher
*Assistant Examiner*—Douglas D. Watts
*Attorney, Agent, or Firm*—Parmelee, Miller, Welsh & Kratz

[57] ABSTRACT

Method and apparatus for cooling a plurality of cans in a batch operation. The apparatus includes a frame, a conveyor extending lengthwise along the frame, and means for driving the conveyor in a forward path from the first end of the frame to the second end of the frame. Arresting means are provided proximate the second end of the frame for restraining the forward movement of the first article on the conveyor. A plurality of pivot arms are spaced along the conveyor for restraining the forward movement of successive articles on the conveyor and spacing each article on the conveyor a predetermined distance from the next adjacent article. The movement of the conveyor thus causes rotational movement of the restrained, spaced articles.

4 Claims, 2 Drawing Figures

APPARATUS FOR SPACING CANS

BACKGROUND OF THE INVENTION

1. Field of the Invention

This invention relates to apparatus for cooling cans subsequent to the filling and sterilization of such cans, and more specifically, to apparatus for cooling batches of cans as opposed to apparatus for continuous operation.

2. Description of the Prior Art

In the standard process of canning food products, the cans are filled with food product and then subjected to high temperature in order to sterilize the cans to prevent spoilage. The cans are maintained at high temperature for a short time, and then must be cooled in order to prevent damage to the food product from sustained heat. In large canning operations, this cooling may be performed on a continuous conveyor line where the cans are sprayed with water as they travel on the conveyor until they are cooled. However, in smaller canning operations it is generally neither economical nor practical to have a conveyor long enough for continuous spraying of the cans until they are cool. Thus, it is more practical to cool the cans in batches in a smaller apparatus. In the present invention, the cans may be spaced from one another in such an apparatus so that the water spray can come in contact with all surfaces of the cans for faster cooling. The cans may also be rotated under the spray to present all surfaces of the cans to the water spray.

SUMMARY OF THE INVENTION

The present invention is an apparatus for positioning a plurality of articles of circular cross-section in a spaced relationship and rotating the articles, and also a method for cooling cans, which method may be performed on such an apparatus. The apparatus includes a frame, a conveyor extending lengthwise along the frame, and means for driving the conveyor in a forward path from the first end of the frame to the second end of the frame. Arresting means are provided proximate the second end of the frame for restraining the forward movement of the first article on the conveyor. A plurality of means are located at spaced intervals along the conveyor for restraining the forward movement of successive articles on the conveyor, and for spacing each article on the conveyor a predetermined distance from the next adjacent article, so that the movement of the conveyor will cause rotational movement of the restrained, spaced articles. This means for restraining and spacing the articles preferably comprises a plurality of pivot arms, spaced along the length of the conveyor, and having circular rollers attached to each end of each pivot arm. The apparatus may also include wheels attached to the frame so as to allow the apparatus to be moved from one location to another.

Cans may be loaded on the conveyor and spaced at predetermined intervals on the conveyor, and then restrained so that forward movement of the conveyor causes a rotational movement of the cans. The cans may then be sprayed with water while they are rotating to cool them, and when cooled, discharged from the conveyor.

DETAILED DESCRIPTION OF THE PREFERRED EMBODIMENT

Figure 1:
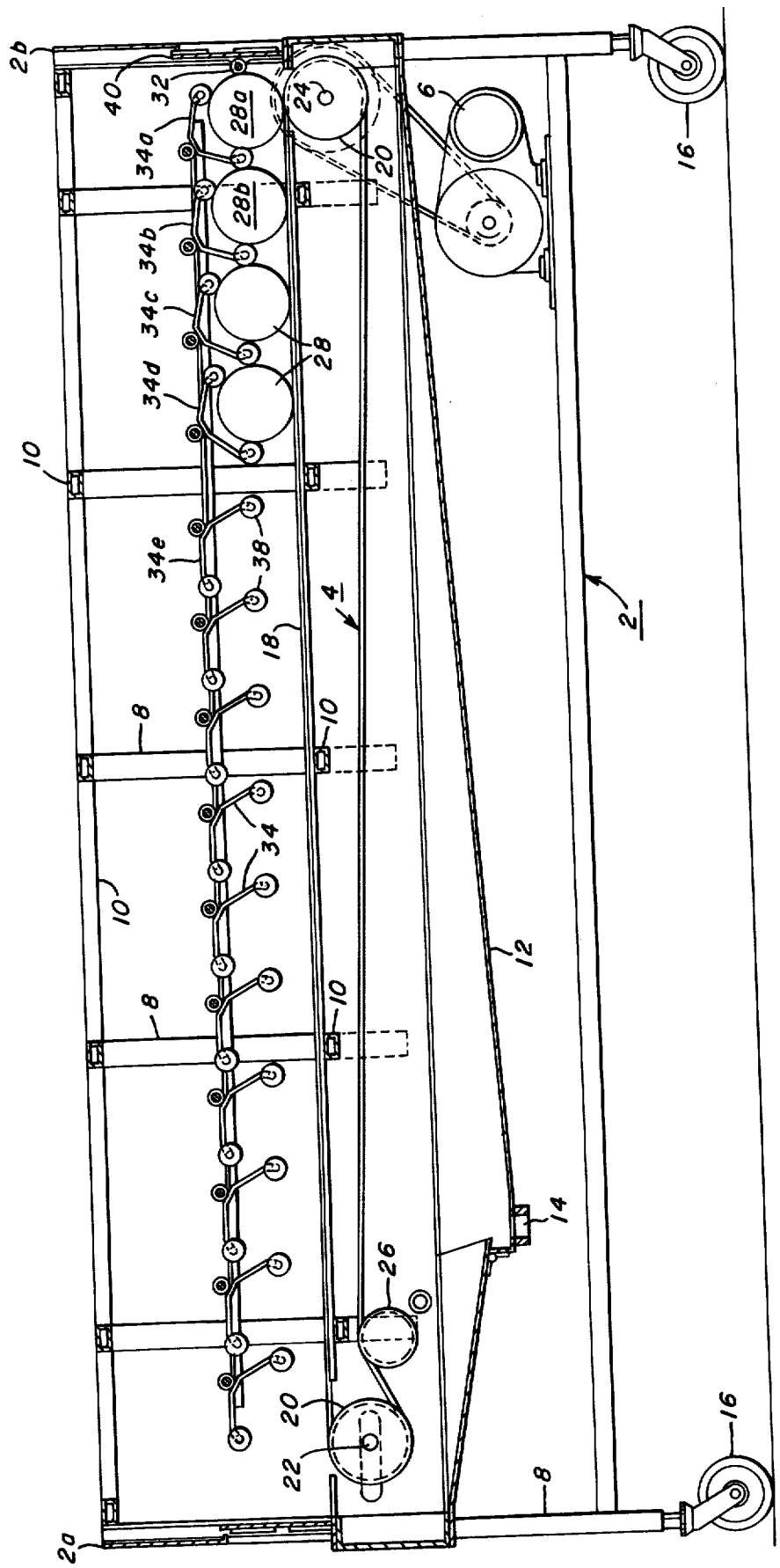
FIG. 1 is a side-sectional view of one embodiment of the apparatus of the present invention.

The present invention can best be understood by reference to the accompanying drawings, which show one embodiment of the apparatus of the present invention. The apparatus includes a frame 2, on which is mounted a conveyor 4 and means, such as a motor 6, for driving the conveyor in a forward path from the first end 2a of the frame 2 to the second end 2b of the frame 2. The frame 2 can be constructed in various ways and in various designs. Preferably, it is an open structure which will allow free passage of water over the conveyor 4 from a water spray (not shown). In the embodiment shown in the drawings the frame 2 is made up of horizontal members, such as tubes 10, and vertical members, such as tubes 8. A drain pan 12 may be included to contain the water from the water spray and direct it to a drain 14. The entire frame 2 may be mounted on means such as wheels 16 so as to make the apparatus portable and able to be moved from one location to another.

Just as the frame 2 is preferably of an open design, so as to allow free passage of water, the conveyor 4 is also preferably of such an open design. In the embodiment shown in the drawings, the conveyor 4 comprises a plurality of V-belts 18 mounted on pulleys 20 located on shafts 22 and 24. Belts 18 are thus moved by motion of shaft 24, which is operatively connected to the motor 6. An idler pulley 26 may be provided to allow for adjustment of tension of the belts 18.

Figure 2:
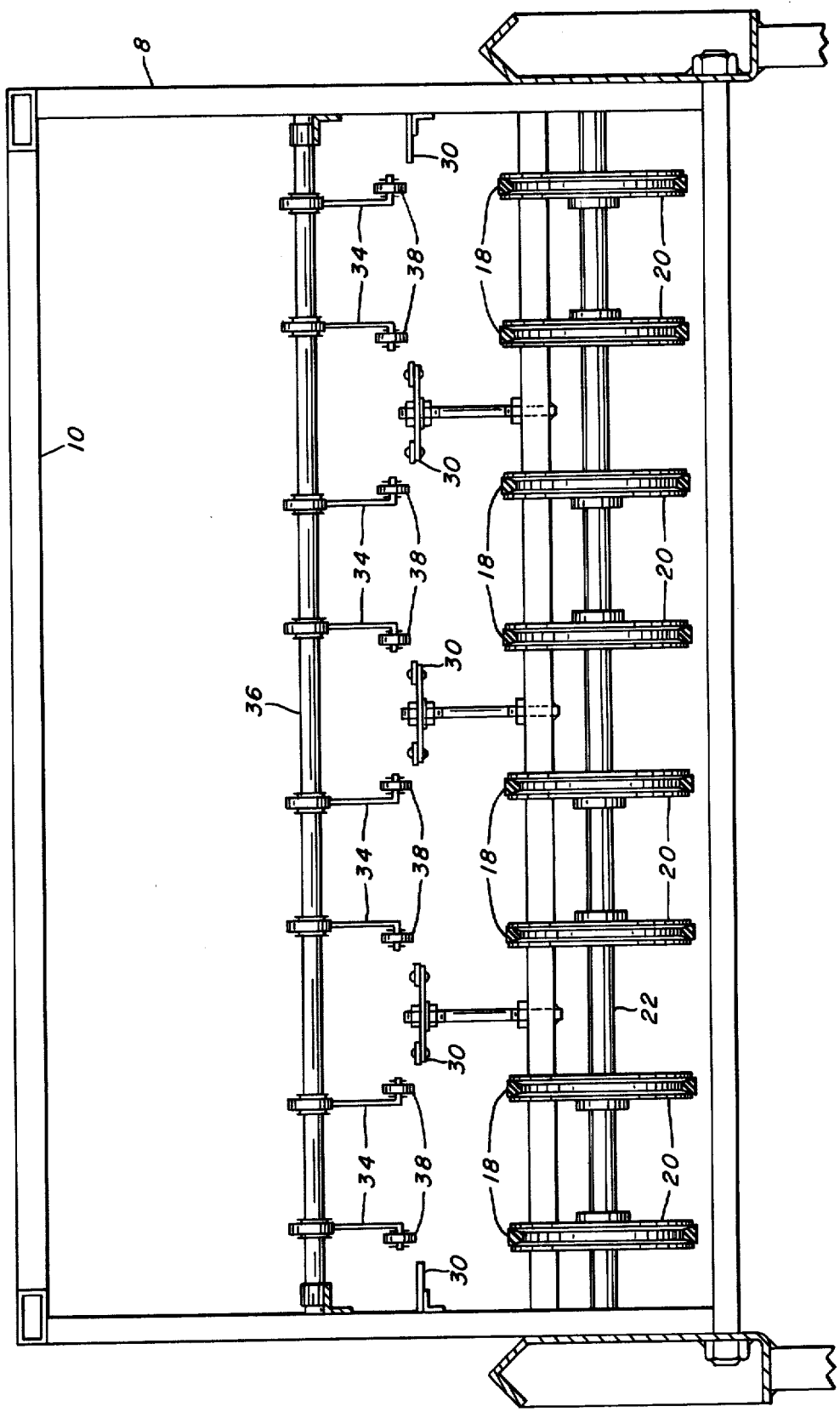
FIG. 2 is an end-sectional view of one embodiment of the present invention.

In the preferred embodiment, belts 18 are arranged in pairs, the belts 18 of each pair being separated a distance which will be determined by the size of the cans 28 which are to be cooled. Four such pairs of belts 18 are shown in the apparatus shown in FIG. 2. Guide rods 30 may be provided to keep the cans 28 properly oriented on the belts 18. Thus, cans 28 which are placed on the conveyor 4 at the first end 2a of the frame 2 will be carried by the motion of the conveyor 4 toward the second end 2b of the frame 2. Arresting means, such as a roller 32 mounted on vertically slidable gate means 40, are provided at the second end 2b of the frame 2 to arrest the movement of the first can 28a traveling on the conveyor 4.

To insure even cooling of the cans 28 under the water spray, a plurality of means are provided for restraining the forward movement of successive cans 28 on the conveyor 4 after the first can 28a, and for spacing each can 28 on the conveyor 4 a predetermined distance from the next adjacent can 28, so that the movement of the conveyor 4 causes rotational movement of the restrained, spaced cans 28. In the preferred embodiment these means for restraining the cans 28 comprise a plurality of pivot arms 34 spaced along the length of the frame 2 and the conveyor 4. These arms 34 are pivotably mounted on the frame 2 by means such as rods 36 extending perpendicular to the length of the conveyor 4. The rods 36 are spaced along the length of the conveyor 4 at distances determined by the diameter of the cans 28 which are to be cooled. In the embodiment shown in the drawings, each rod 36 is spaced from the next adjacent rod 36 a distance corresponding to the diameter of the cans 28 to be cooled, plus a distance corresponding to the space to be provided between the cans during cooling. Thus, each pivot arm 34 is a predetermined distance from the next adjacent pivot arm 34.

Each of the pivot arms 34 has first and second ends, with the first end being weighted such that the pivot arms rests in a first position with the first end lower than the second end, as shown by pivot arm 34e in FIG. 1. Each pivot arm is also pivotable to a second position with the second end lower than the first end, as shown by pivot arm 34a in FIG. 1. In order to more accurately space the cans 28, each pivot arm 34 may be provided with circular rollers 38, one such roller 38 being attached to each end of each pivot arm 34. These rollers 38 have a diameter equal to the predetermined distance between cans 28 on the conveyor 4 when the cans 28 are properly spaced.

From the preceding description of the apparatus of the present invention, the operation of the apparatus can be seen. Cans 28 are loaded on the conveyor 4 at the first end 2a of the frame 2, and passed by the movement of the conveyor 4 toward the second end 2b of the frame 2. As each can 28 passes each successive position to the second position, and as the can 28 passes beyond that pivot arm 34, that pivot arm 34 will return to the first position. When the first can 28a reaches the second end 2b of the frame 2, it will be stopped by the arresting means 32, but will continue to rotate in place because of the forward movement of the conveyor 4. In moving into this position, the first can 28a will cause a first pivot arm 34a to move from the first position to the second position. In this second position, the second end of the pivot arm 34a will be located between the first can 28a and the second can 28b. Thus the second can 28b is restrained by, and spaced from, the first can 28a by the circular roller 38 at the second end of the first pivot arm 34a. As with the first can 28a, the second can 28b will be restrained, but will continue to rotate because of the forward motion of the conveyor 4. The second can 28b will in turn cause the second pivot arm 34b to move to the second position. Each succeeding can 28 traveling on the conveyor 4 will then be restrained by, and spaced from the preceding can 28 by, the second end of the pivot arm 34 associated with the preceding can 28, and will force the next adjacent pivot arm 34 to the second position. FIG. 1 shows the apparatus with four cans 28 in spaced relationship, and four pivot arms 34a, 34b, 34c, and 34d in the second position.

The frame 2 may be filled with any number of cans 28 up to the maximum capacity of the apparatus. The apparatus shown in FIGS. 1 and 2 has four pairs of V-belts 18 and thus can hold four rows of fourteen cans 28 each, or a total of fifty-six cans 28. When the frame 2 has been filled with the desired number of cans 28, the apparatus is placed under a water spray (not shown in the drawings), and water is sprayed over the rotating cans 28 until they are sufficiently cooled. When the cans 28 are sufficiently cooled, the gate means 40 may be raised, and the movement of the conveyor 4 will cause the cans 28 to move toward the second end 2b of the frame 2, and out of the apparatus.

It can be seen that the present invention may be used for cooling articles other than cans, and also for spacing and rotating articles for other purposes than cooling under a water spray. There has thus been described an apparatus for positioning in a spaced relationship, and rotating, a plurality of articles of circular cross-section, and more particularly an apparatus for cooling a plurality of cans by spacing and rotating the cans under a water spray. There has also been disclosed a method for cooling a plurality of cans in an apparatus having a conveyor moving in a forward path and means for spraying water across the forward path of the conveyor.

We claim:

1. Apparatus for positioning in a spaced relationship, and rotating, a plurality of articles of circular cross-section comprising:
   a. a frame;
   b. a conveyor extending lengthwise along the frame;
   c. means for driving the conveyor in a forward path from the first end of the frame to the second end of the frame;
   d. arresting means proximate the second end of the frame for restraining the forward movement of a first article on he conveyor; and
   e. means for restraining the forward movement of successive articles on the conveyor and spacing each article on the conveyor a predetermined distance from the next adjacent article, so that the movement of the conveyor causes rotational movement of the restrained, spaced articles, which means comprise
      i. a plurality of pivot arms spaced along the length of the conveyor, including a first pivot arm which is closest to the arresting means, and a second pivot arm which is the pivot arm next adjacent to the first pivot arm,
         each pivot arm being a predetermined distance from the next adjacent pivot arm,
         each of the pivot arms having first and second ends, the first end of each pivot arm being weighted such that the pivot arm rests in a first position with the first end lower than the second end,
         each arm being pivotable to a second position with the second end lower than the first end, and
      ii. a plurality of circular rollers, each roller having a diameter equal to the predetermined distance between articles on the conveyor, one roller being attached to each end of each pivot arm,
         whereby, the first article traveling on the conveyor is restrained by the arresting means, and forces the first pivot arm to the second position,
         the second article traveling on the conveyor is restrained by, and spaced from the first article by, the second end of the first pivot arm, and forces the second pivot arm to the second position, and
         each succeeding article traveling on the conveyor is restrained by, and spaced from the preceding article by, the second end of the pivot arm associated with the preceding article, and forces the next adjacent pivot arm to the second position.

2. The apparatus defined in claim 1 wherein the arresting means comprises a roller, attached to the second end of the frame, and movable between a position in the forward path of the articles and a position away from the forward path of the articles.

3. The apparatus as claimed in claim 1 including wheel means attached to the frame so as to allow the apparatus to be moved from one location to another.

4. Apparatus for cooling a plurality of cans by spacing and rotating the cans under a water spray, comprising:
   a. a frame;
   b. a conveyor, extending lengthwise of the frame, and adapted to support the cans with their longitudinal axes horizontal and perpendicular to the length of the conveyor;
   c. means for driving the conveyor in a forward path from the first end of the frame to the second end of the frame;
   d. rotatable arresting means proximate the second end of the frame for restraining forward movement of the first can on the conveyor, but permitting rotational movement of the first can while said can is in contact with said arresting means; and
   e. a plurality of rotatable spacing means mounted at regular intervals along the length of the conveyor for restraining and spacing each can a predetermined distance from the next adjacent can so that the forward movement of the conveyor causes rotational movement of the restrained, spaced cans, each of said rotatable spacing means being of circular cross-section, and having a diameter equal to the predetermined spacing between the cans, each of said rotatable spacing means being movably mounted to the frame such that
      the first can on the conveyor forces the first rotatable spacing means into a position between the first can and the second can, spacing the second can the predetermined distance from the first can, but permitting rotational movement of the second can, and
      each succeeding can on the conveyor forces the next adjacent rotatable spacing means between said can and the next adjacent can, spacing each can the predetermined distance from each adjacent can, but permitting rotational movement of each can.

* * * * *